(12) United States Patent
Hanibuchi

(10) Patent No.: US 7,376,190 B2
(45) Date of Patent: May 20, 2008

(54) ASYNCHRONOUS DATA TRANSMITTING APPARATUS

(75) Inventor: Toshiaki Hanibuchi, Tokyo (JP)

(73) Assignee: Renesas Technology Corp., Chiyoda-ku, Tokyo (JP)

(*) Notice: Subject to any disclaimer, the term of this patent is extended or adjusted under 35 U.S.C. 154(b) by 714 days.

(21) Appl. No.: 10/731,026

(22) Filed: Dec. 10, 2003

(65) Prior Publication Data

US 2004/0202253 A1  Oct. 14, 2004

(30) Foreign Application Priority Data

Apr. 8, 2003  (JP)  ............................. 2003-104529

(51) Int. Cl.
*H04B 3/00* (2006.01)

(52) U.S. Cl. ...................... 375/257; 375/355; 375/370; 375/371; 327/141

(58) Field of Classification Search ................ 375/257, 375/371, 370
See application file for complete search history.

(56) References Cited

U.S. PATENT DOCUMENTS

2003/0043926 A1* 3/2003 Terashima et al. .......... 375/257

2005/0243612 A1* 11/2005 Barth et al. ............ 365/189.05

FOREIGN PATENT DOCUMENTS

| JP | 4-178047 | | 6/1992 |
|---|---|---|---|
| JP | 5-264602 | | 10/1993 |
| JP | 6-54016 | | 2/1994 |
| JP | 06054016 A | * | 2/1994 |
| JP | 2002-300009 | | 10/2002 |

* cited by examiner

*Primary Examiner*—David C. Payne
*Assistant Examiner*—Leon Flores
(74) *Attorney, Agent, or Firm*—Buchanan Ingersoll & Rooney PC

(57) ABSTRACT

An asynchronous data transmitting apparatus includes data signal transmission lines; two control transmission lines having a minimum delay and maximum delay respectively; a transmitter; and a receiver. The transmitter includes a data transmitting unit that transmits a data signal through the data signal transmission lines, depending on a transmit clock; and control transmitting units that transmit control signals through the control transmission lines, depending on the transmit clock. The receiver includes a receive clock generator that generates a read clock from the control signals; and a data receiving unit that receives the data signal through the data signal transmission line, depending on the read clock.

11 Claims, 17 Drawing Sheets

ASYNCHRONOUS DATA TRANSMITTING APPARATUS

BACKGROUND OF THE INVENTION

1) Field of the Invention

The present invention relates to an asynchronous data transmitting apparatus.

2) Description of the Related Art

Asynchronous data transmitting apparatuses includes a transmitter and a receiver that are connected via parallel transmission lines. The transmitter transmits data signals to the receiver by a transmit clock and a receive clock and the receiver receives the data signals by a receive clock. In other words, the transmitter and receiver operate asynchronously from each other.

FIG. 16 is a block diagram of a conventional asynchronous data transmitting apparatus. FIG. 17 is a timing chart to explain the data receiving when a skew occurs in the data of the asynchronous data transmitting apparatus shown in FIG. 16. A transmitter 100 and a receiver 200 are connected, for instance, via three signal transmission lines 301, 302, and 303 that are parallel transmission lines. A transmit clock CLOCK_A of the transmitter 100 and a receive clock CLOCK_C of the receiver 200 are generated independent of each other with no fixed phase relation between the CLOCK_A and the CLOCK_C.

In the transmitter 100, three flip-flops 111, 112, and 113 form a synchronous circuit and read three bits of transmitted data of DATA_0, DATA_1, and DATA_2, in synchronization with the CLOCK_A. Moreover, the flip-flops 111, 112, and 113 deliver the transmission data to signal transmission lines 301, 302, and 303, as data of DATA_0A, DATA_1A, and DATA_2A, respectively.

In the receiver 200, three flip-flops 211, 212, and 213 form a synchronous circuit and read transmission data of DATA_0B, DATA_1B, and DATA_2B from the three signal transmission lines 301, 302, and 303, in synchronization with the CLOCK_C. Moreover, the flip-flops 211, 212, and 213 deliver the data read to a processing system, as data of DATA$_{13}$ 0C, DATA_1C, and DATA_2C.

In such an asynchronous data transmitting apparatus, the transmitter and receiver communicate control signals in order to acquire an appropriate timing for the transmitting or the receiving. Therefore, since the receiver allows the receiving of the data signal at the time when receiving the control signals from the transmitter, there is no problem with a data delay time on the signal transmission lines.

However, in the asynchronous data transmitting apparatus, the timing when the transmission data changes and the timing when the data is read by the receive clock are completely asynchronous. Hence, at times, a reading edge of the receive clock comes in a period when the transmission data changes. As a result, following two problems arise.

The first problem is as follows. When the data to be read in the flip-flops completely overlaps with the timing of data reading, the data reading remains incomplete. As a result, a metastable state occurs in which the output of the flip-flops ends up with an intermediate potential, and the changed signals are reconverted to the original state.

The second problem, even though it may not cause metastability, is as follows. If in the parallel transmission lines, which transmit the plural bit data in parallel, the delay amount differs in each of the transmission lines, then at times the timing of data reading between the parallel databits may precede or follow the timing when the data changes. Thus, as shown in FIG. 17, a combination of such databits is received which do not exist at the transmitting end. The difference in the data delay amount is called a skew. A detailed explanation of the reception operation when a skew occurs in the data of the asynchronous data transmitting apparatus is given next with reference to FIG. 17.

The transmitter 100 sends, as the transmission data DATA_2A, DATA_1A, and DATA_0A, databits "100", "011", and "100" in the same sequence, in synchronization with the transmit clock CLOCK_A. The three signal transmission lines have different delay amounts. The delay amount in the signal transmission lines goes on increasing in the sequence of the signal transmission line 303 that carries the transmission data DATA_0A, the signal transmission line 302 that carries the transmission data DATA_1A, and the signal transmission line 301 that carries the transmission data DATA_2A.

As a result, the time at which the change of databit occurs is different in the transmission data DATA_2B, DATA_1B, and DATA_0B reaching the receiver 200. That is, the change takes place earliest in the transmission data DATA_0B, then in the transmission data DATA_1B, and last in the transmission data DATA_2B. The receiver 200 reads the transmission data in the sequence DATA_2B, DATA_1B, and DATA_0B at a data reading timing 401 that is in synchronization with the leading edge of the receive clock CLOCK_C.

At this time, in the first transmission data DATA_2B, DATA_1B, and DATA_0B, the data reading timing 401 falls after the change in the databits. Consequently, the databit of the reception data DATA_2C, DATA_1C, and DATA_0C will be the same as the databit of the transmission data, namely "100".

However, in the second transmission data DATA_2B, DATA_1B, DATA_0B, the data reading timing 402 precedes the transition point in the transmission data DATA_2B whereas it falls after the transition point in the transmission data DATA_1B and DATA_0B. Consequently, the databits of the reception data DATA_2C, DATA_1C, and DATA_0C become "111", as compared to the databit "011" of the transmitting end. As a result, the receiver receives an incorrect data and consequently performs an incorrect operation.

A number of ideas as well as preventive measures have been proposed for circumventing the first problem, that is, the metastable state. However, regarding the second problem, that is, a skew between the data, it is practically not possible to eliminate the problem completely as the timing of the receive clock cannot be predicted. An incorrect data is read in the asynchronous data transmission when there is a skew between the data and when the reading of data and the change in data coincidentally occur at the same time. Thus, the probability that an incorrect data is read is very low.

Consequently, the conventional technologies, as disclosed in Japanese Patent Application Laid-Open No. 6-54016 (hereinafter, "first conventional art") and Japanese Patent Application Laid-Open No. 4-178047 (hereinafter, "second conventional art"), focus on reducing the skew between the data as much as possible and thereby reducing the probability of reading an incorrect combination of data at the receiving end.

In the first conventional art, a skew correction circuit is disclosed, which includes a detecting unit that detects, from edges that must have the same timing, the edge of one transmission signal from among plural transmission signals transmitted by parallel transmission lines, a correction signal generating unit that generates correction signals according to the edge cycle of the edge detected by the detecting unit, and a correction unit that synchronizes the edges of the plural transmission signals with the correction signals generated by the correction signal generating unit and then outputs in synchronization all those edges.

In the second conventional art, a skew correction system for obtaining a skew-corrected data is disclosed, which includes a skew measurement signal pattern detecting circuit-cum-skew value detecting circuit that detects, after receiving from the receiving end the predetermined data set beforehand, the delay amount of the data with maximum phase advancement, a control circuit that outputs a control signal to correct the delay amount, based on each delay amount detected by the skew measurement signal pattern detecting circuit-cum-skew value detecting circuit, and a skew correction circuit that selects and outputs, from among the parallel outputs, the data on which skew correction is carried out by the control signal.

As the asynchronous data transmission is employed in a semiconductor integrated circuit, care is always taken when designing the transmission line. However, it is still practically not possible to reduce the skew between the data occurring in the parallel transmission lines to zero. As a large number of asynchronous data transmissions are employed in the recent large-scale semiconductor integrated circuits, it is not possible to ignore the problem of a skew between the data and incorrect operations may frequently occur as a result inside the apparatus itself. However, especially in case of the large-scale semiconductor integrated circuits, provisions made to eliminate incorrect data reading due to a skew between the data are insufficient. Thus, active measures to find a fundamental solution are expected in order to avoid incorrect data reading.

SUMMARY OF THE INVENTION

It is an object of the present invention to at least solve the problems in the conventional technology.

The asynchronous data transmitting apparatus according to one aspect of the present invention includes a first transmission line having a first delay; a second transmission line having a second delay smaller than the first delay; a third transmission line having a second delay larger than the first delay; a transmitter; and a receiver. The transmitter includes a first transmitting unit that transmits a data signal through the first transmission line, depending on a first clock; a second transmitting unit that transmits a control signal through the second transmission line, depending on the first clock; and a third transmitting unit that transmits the control signal through the third transmission line, depending on the first clock. The receiver includes a clock generator that generates a second clock from the control signals transmitted through the second and third transmission line, wherein a pulse of the second clock is provided in a period from a first pulse-edge of the control signal transmitted through the third transmission line to a second pulse-edge subsequent to the first pulse-edge, the second pulse-edge being of the control signal transmitted through the second transmission line; and a data receiving unit that receives the data signal through the first transmission line, depending on the second clock.

The asynchronous data transmitting apparatus according to another aspect of the present invention includes a first transmission line having a first delay; a second transmission line having a second delay smaller than the first delay; a third transmission line having a second delay larger than the first delay; a transmitter; and a receiver. The transmitter includes a first transmitting unit that transmits a data signal through the first transmission line, depending on a first clock; a second transmitting unit that transmits a control signal through the second transmission line, depending on the first clock; and a third transmitting unit that transmits the control signal through the third transmission line, depending on the first clock. The receiver includes a data receiving unit that receives the data signal through the first transmission line, depending on a second clock; and a processing unit that generates an enable signal from the control signals transmitted through the second and third transmission line, and determines whether to read the data signal received based on the enable signal, wherein a pulse of the second clock is provided in a period from a first pulse-edge of the control signal transmitted through the third transmission line to a second pulse-edge subsequent to the first pulse-edge, the second pulse-edge being of the control signal transmitted through the second transmission line.

The asynchronous data transmitting apparatus according to still another aspect of the present invention includes a first transmission line having a first delay; a second transmission line having a second delay; a transmitter that includes a first transmitting unit that transmits a data signal through the first transmission line, depending on a first clock; and a second transmitting unit that transmits a control signal through the second transmission line, depending on the first clock; and a receiver that includes a clock generator that generates a second clock from the control signal transmitted through the second transmission line; and a data receiving unit that receives the data signal through the first transmission line, depending on the second clock.

The other objects, features and advantages of the present invention are specifically set forth in or will become apparent from the following detailed descriptions of the invention when read in conjunction with the accompanying drawings.

DETAILED DESCRIPTION

Exemplary embodiments of asynchronous data transmitting apparatus relating to the present invention will be explained in detail below with reference to the accompanying drawings.

Figure 1:
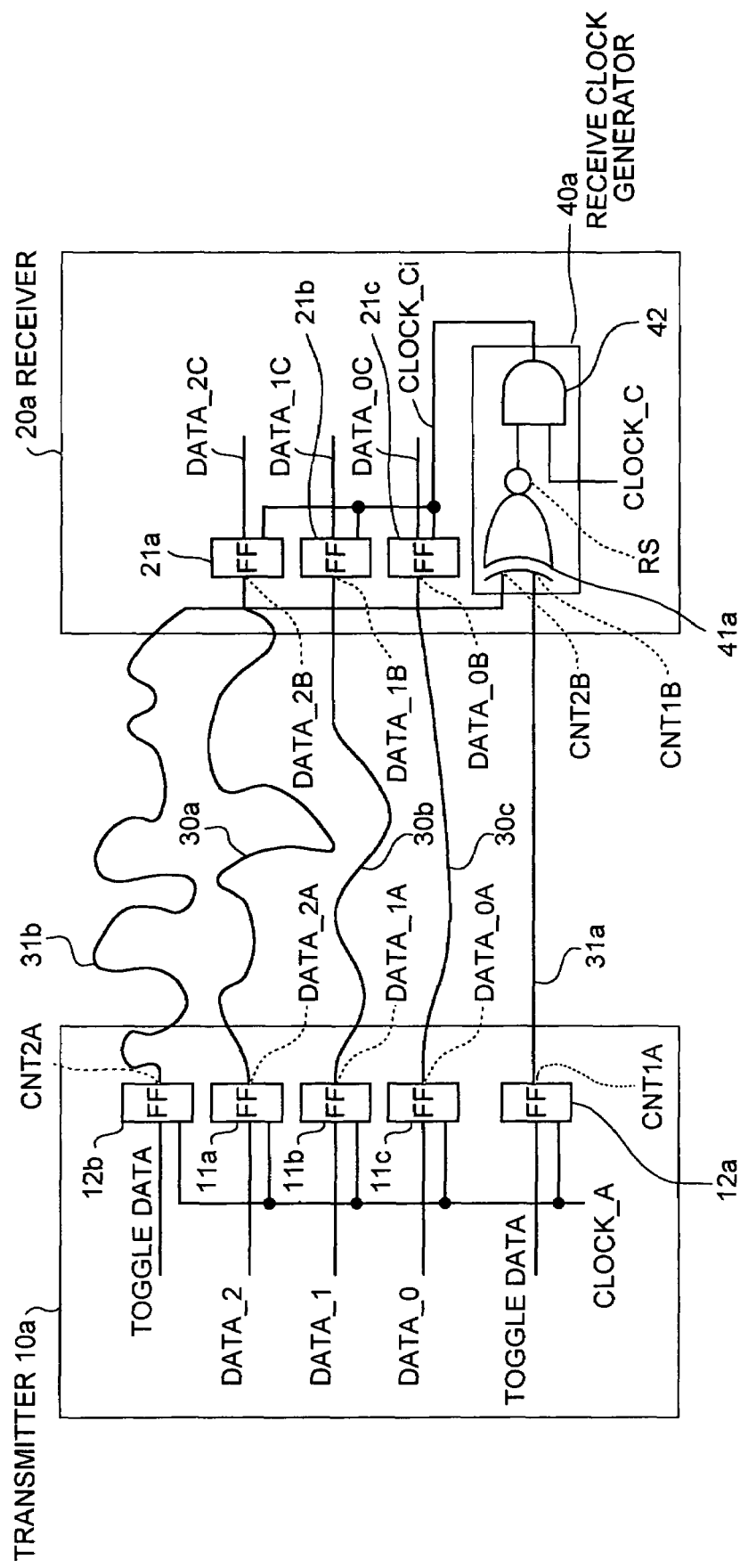
FIG. 1 is a block diagram of an asynchronous data transmitting apparatus according to a first embodiment of the present invention.

FIG. 1 is a block diagram of an asynchronous data transmitting apparatus according to a first embodiment of the present invention. A transmitter 10a and a receiver 20a are connected, for instance, via two control transmission lines 31a and 31b, in addition to three signal transmission lines 30a, 30b, and 30c. The control transmission line 31a is adjusted in such a way that it holds the minimum delay amount from among all the three signal transmission lines 30a, 30b, and 30c. The control transmission line 31b is adjusted in such a way that it holds the maximum delay amount from among all the three signal transmission lines 30a, 30b, and 30c.

A transmit clock CLOCK_A of the transmitter 10a and a receive clock CLOCK_C of the receiver 20a are generated independent of each other with no fixed phase relation between the transmit clock CLOCK_A and the receive clock CLOCK_C.

The transmitter 10a includes transmission flip-flops 11a, 11b, and 11c, which carry out a synchronous operation according to the transmit clock CLOCK_A and control flip-flops 12a and 12b. Transmission data DATA_2, DATA_1, and DATA_0 are input into the transmission flip-flops 11a, 11b, and 11c. The transmission flip-flops 11a, 11b, and 11c synchronize and output transmission data DATA_2A, DATA_1A, and DATA_0A, which are then transmitted to the signal transmission lines 30a, 30b and 30c.

Toggle data signals that have alternating binary level in every transmission cycle are input into the control flip-flops 12a and 12b as control signals to avoid a skew between the data. The control flip-flops 12a and 12b synchronize and output control signals CNT1A and CNT2A, which are then transmitted to the control transmission lines 31a and 31b.

Apart from reception flip-flops 21a, 21b, and 21c, the receiver 20a also includes a receive clock generator 40a that reads control signals CNT1B and CNT2B from the control transmission lines 31a and 31b. The receive clock CLOCK_C is input into the receive clock generator 40a and the receive clock generator 40a then generates a reading clock CLOCK_Ci, as explained later.

The reception flip-flops 21a, 21b, and 21c read, according to the reading clock CLOCK_Ci, transmission data DATA_2B, Data 1B, Data 0B from the signal transmission lines 30a, 30b, and 30c and then output to the internal processing system transmission data DATA_2C, DATA_1C, and DATA_0C.

The receive clock generator 40a according to the first embodiment includes a suppression period determining circuit 41a in which the control signals CNT1B and CNT2B from the control transmission lines 31a and 31b are input, and a receive clock suppressing circuit 42 that receives the output of the suppression period determining circuit 41a, that is, a reception suppressing signal RS as the first input and the receive clock CLOCK_C as the second input.

The suppression period determining circuit 41a includes an EXNOR circuit. In the period when the control signals CNT1B and CNT2B are at variance, and in the reception suppressing period, the suppressing period determining circuit 41a treats the reception suppressing signal RS input to the receive clock suppressing circuit 42 to be at low level (hereinafter "L level").

The receive clock suppressing circuit 42 includes an AND circuit. In the period when the reception suppressing signal RS is at high level (hereinafter "H level"), the receive clock suppressing circuit 42 transforms the receive clock CLOCK_C into a reading clock CLOCK_Ci, and outputs the reading clock CLOCK_Ci.

Figure 2:
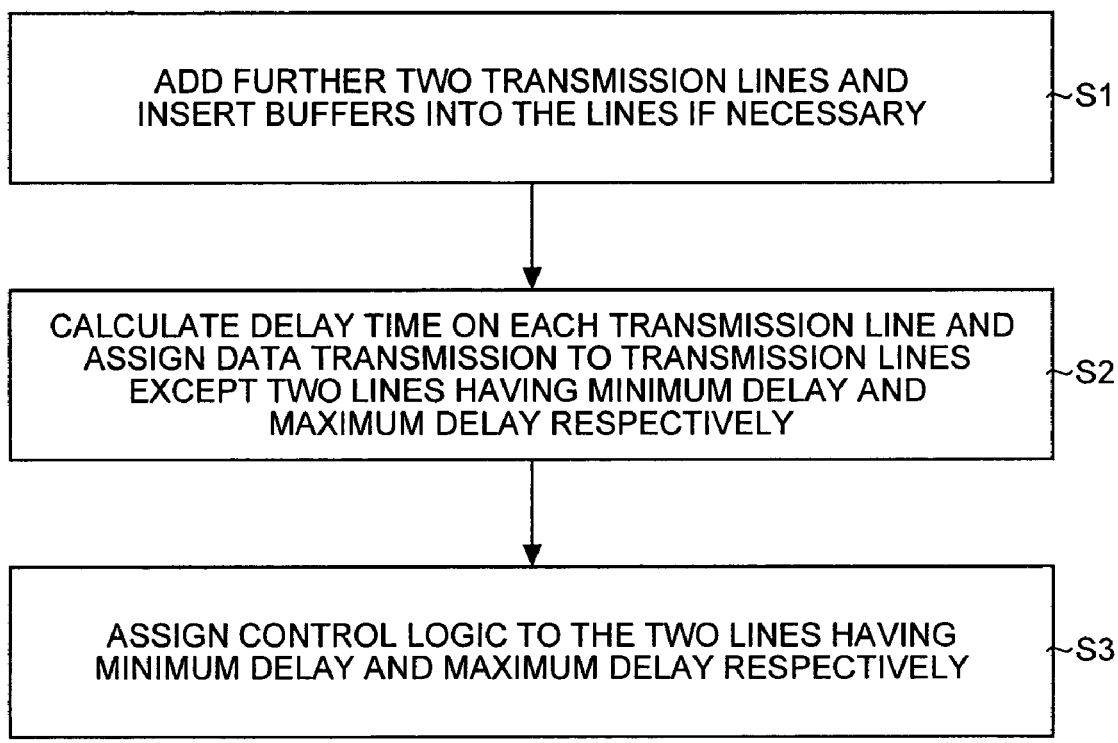
FIG. 2 is a flowchart to explain a sequence of steps involved in reading control signals into an asynchronous system in order to prevent a skew between the data.

In the example shown in FIG. 1, although the signal transmission lines 30a, 30b, and 30c as well as the control transmission lines 31a and 31b may be decided in a fixed manner from the very beginning of the operation, it is desirable to configure the circuits according to a procedure explained in FIG. 2, after laying down these five circuits. FIG. 2 is a flowchart that explains the sequence of steps involved in reading control signals into an asynchronous system in order to prevent a skew between the data.

In step S1 of FIG. 2, line is provided to the parallel data transmission between the corresponding circuit blocks, with two more lines added to the lines that are necessary for the parallel data transmission. In this case, there may be a need to insert a buffer according to a line router.

In step S2, the delay time of the signal transmission between the circuit blocks is calculated for each bit and two lines are assigned to the minimum delay amount and the maximum delay amount. The remaining lines are assigned to the signal transmission lines between the actual circuit blocks. In other words, the corresponding synchronous circuits (transmission flip-flops and reception flip-flops) of the transmitter and the receiver are connected by these signal transmission lines.

In step S3, separate lines that hold the minimum delay amount and the maximum delay amount are assigned as the control transmission lines to the reception data reading control logic according to the present embodiment. In other words, in the example shown in FIG. 1, in the transmitter 10a, the control transmission lines are connected to the synchronous circuits (control flip-flops 12a and 12b) that output the control signals. In the receiver 20a, the control transmission lines are connected to the newly provided receive clock generator 40a to create reading clock CLOCK_Ci in order to avoid a skew between the data.

The operation of the asynchronous data transmitting apparatus described above is explained next with reference to FIG. 1 and the timing chart shown in FIG. 3.

Figure 3:
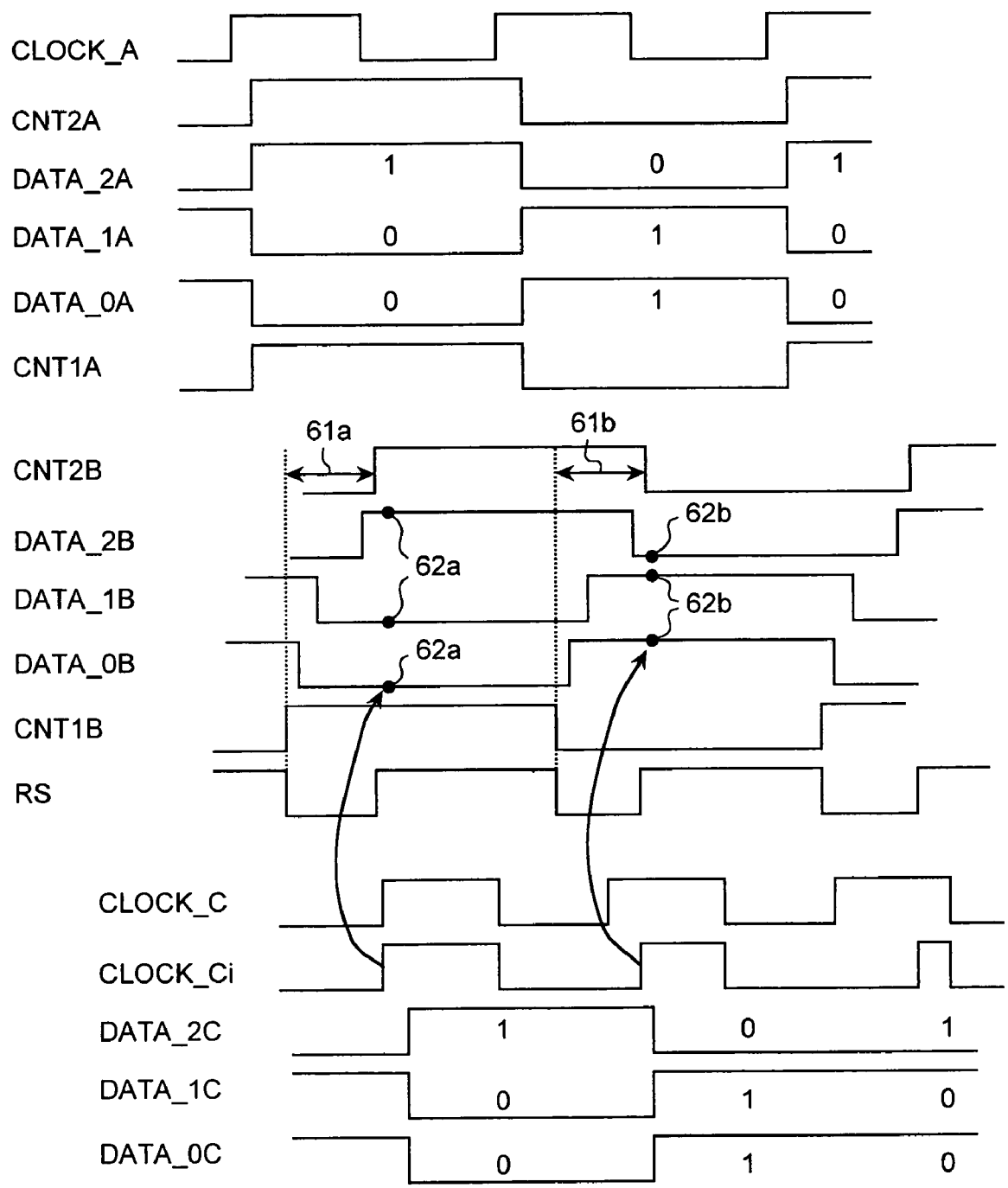
FIG. 3 is a timing chart to explain the operation of the asynchronous data transmitting apparatus shown in FIG. 1.

In FIG. 3, in the transmitter 10a, the transmission data DATA_2A, DATA_1A, and DATA_0A and the control signals CNT1A and CNT2A are output in synchronization with the transmit clock CLOCK_A. The databits of the transmission data DATA_2A, DATA_1A, and DATA_0A are "100", "011", and "100". The control signals CNT1A and CNT2A, being toggle data signals, show alternating H level and L level for each clock cycle of the transmit clock CLOCK_A.

In the example shown in FIG. 3, the data delay amount goes on increasing in the sequence of the signal transmission line 30c that carries the transmission data DATA_0A, the signal transmission line 30b that carries the transmission data DATA_1A, and the signal transmission line 30a that carries the transmission data DATA_2A. As a result, the transmission data in the receiver 20a arrives in the sequence of the transmission data DATA_0B from the signal transmission line 30c, the transmission data DATA_1B from the signal transmission line 30b, and the transmission data DATA_2B from the signal transmission line 30a.

Since the control transmission line 31a that carries the control signal CNT1A has the minimum delay amount, the control signal CNT1B from the control transmission line 31a reaches the receiver 20a even earlier than the transmission data DATA_0B. Also, since the control transmission line 31b that carries the control signal CNT2A has the maximum delay amount, the control signal CNT2B from the control transmission line 31b reaches the receiver even later than the transmission data DATA_2B.

In other words, the transmission data DATA_0B, DATA_1B, and DATA_2B sequentially reach the receiver 20a in a period 61a when the control signal CNT1B reaches the receiver 20a and in a period 61b when the control signal CNT2B reaches the receiver 20a. However, since each of the data is changing in the periods 61a and 61b, if the reading takes place in these periods 61a and 61b, incorrect data reading due to a skew between the data is likely to occur.

H level and L level for both the control signals CNT1B and CNT2B change identically. Thus, in the periods 61a and 61b from when the control signal CNT1B arrives until the control signal CNT2B arrives, the two signals are at variance. Consequently, the suppression period determining circuit 41a detects, as the reception suppressing periods, the variance periods 61a and 61b in the receive clock generator 40a and generates the L level reception suppressing signal RS in the reception suppressing periods 61a and 61b. The receive clock suppressing circuit 42 retrieves the logical product of the reception suppressing signal RS and the receive clock CLOCK_C. The receive clock suppressing circuit 42 then generates the reading clock CLOCK_Ci that is obtained by shifting the clock edge of the receive clock CLOCK_C, which rises to the trigger level, to a position after the reception suppressing periods 61a and 61b.

As a result, data reading timings 62a and 62b, that is the timings when the transmission data DATA_2B, DATA_1B, and DATA_0B from the signal transmission lines 30a, 30b, and 30c are read into the leading edge of the reading clock CLOCK_Ci, always fall after the change has taken place in all the data, as shown in FIG. 3. Thus reading of an incorrect data is definitively prevented.

The transmission data DATA_2B, DATA_1B, and DATA_0B from the signal transmission lines 30a, 30b, and 30c are read into the leading edge of the reading clock CLOCK_Ci, at the data reading timing 62a that is shifted to a position after the reception suppressing period 61a and at the data reading timing 62b that is shifted to a position after the reception suppressing period 61b.

Accordingly, the logically correct reception data DATA_2C, DATA_1C, and DATA_0C, which is identical to the databits "100", "011", and "100" of the transmission data DATA_2, DATA_1, and DATA_0, can be obtained.

There may occur a delay in the reception of data due to suppression of data reading. However, as all the blocks in the apparatus according to the present invention operate in an asynchronous manner, time delay does not pose a problem.

Figure 4:
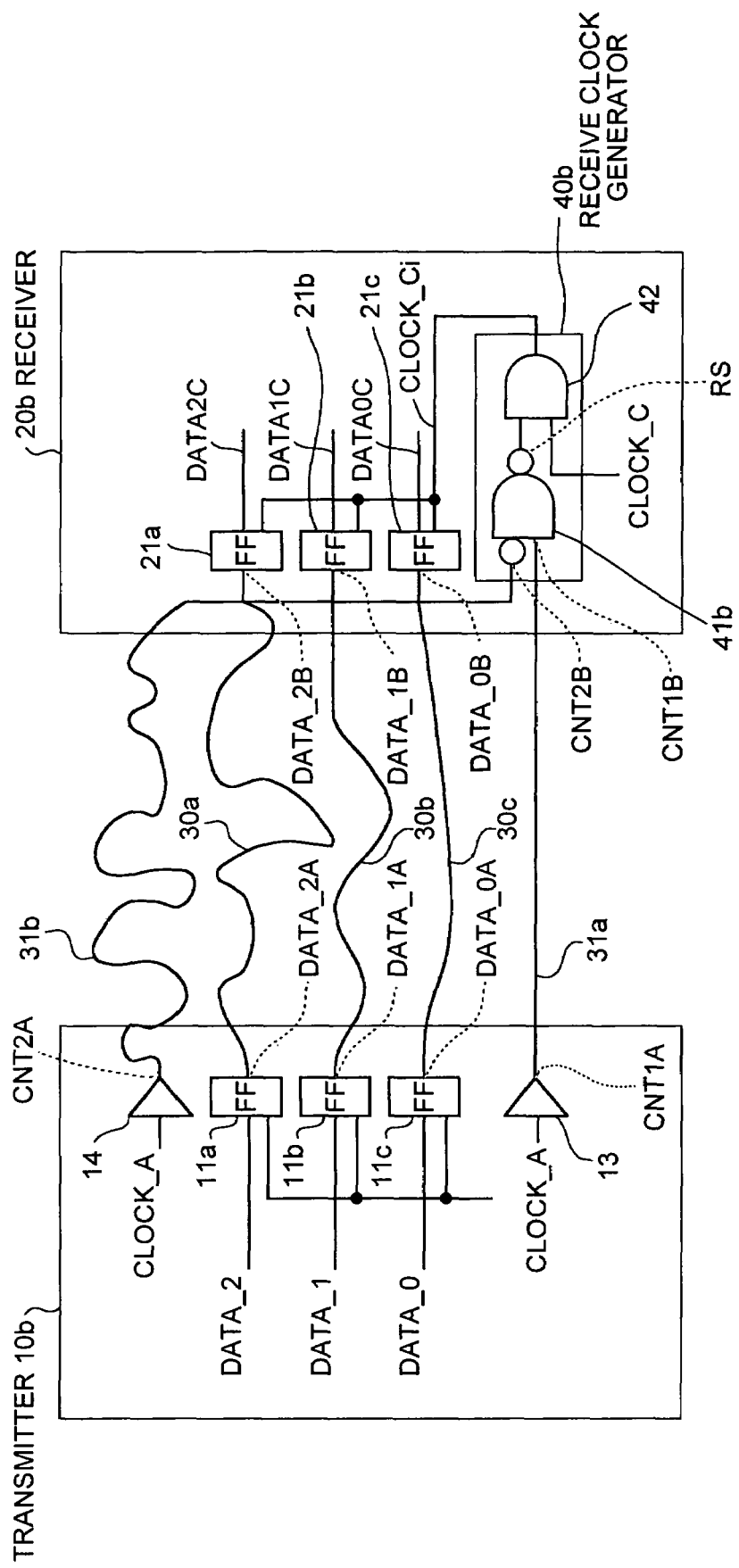
FIG. 4 is a block diagram of an asynchronous data transmitting apparatus according to a second embodiment of the present invention.

FIG. 4 is a block diagram of an asynchronous data transmitting apparatus according to a second embodiment of the present invention. The parts in FIG. 4 that are identical or equivalent to those in FIG. 1 are assigned the same reference numerals. In this section, the focus is mainly on the parts present in the second embodiment.

The asynchronous data transmitting apparatus shown in FIG. 4 comprises a transmitter 10b, substituted in place of the transmitter 10a shown in FIG. 1 and a receiver 20b, substituted in place of the receiver 20a shown in FIG. 1.

The transmitter 10b comprises buffers 13 and 14, substituted in place of the control flip-flops 12a and 12b of the transmitter 10a shown in FIG. 1. A transmit clock CLOCK_A is input into the buffers 13 and 14.

The receiver 20b includes a receive clock generator 40b, substituted in place of the receive clock generator 40a of the receiver 20a shown in FIG. 1. The receive clock generator 40b includes a suppression period determining circuit 41b, substituted in place of the suppression period determining circuit 41a of the receiver 20a shown in FIG. 1.

The suppression period determining circuit 41b includes a NAND circuit that has an inverting input terminal. A control signal CNT2B is input into the inverting input terminal, while a control signal CNT1B is input into a normal input terminal.

The operation of the asynchronous data transmitting apparatus described above is explained next with reference to FIG. 4 and a timing chart shown in FIG. 5.

Figure 5:
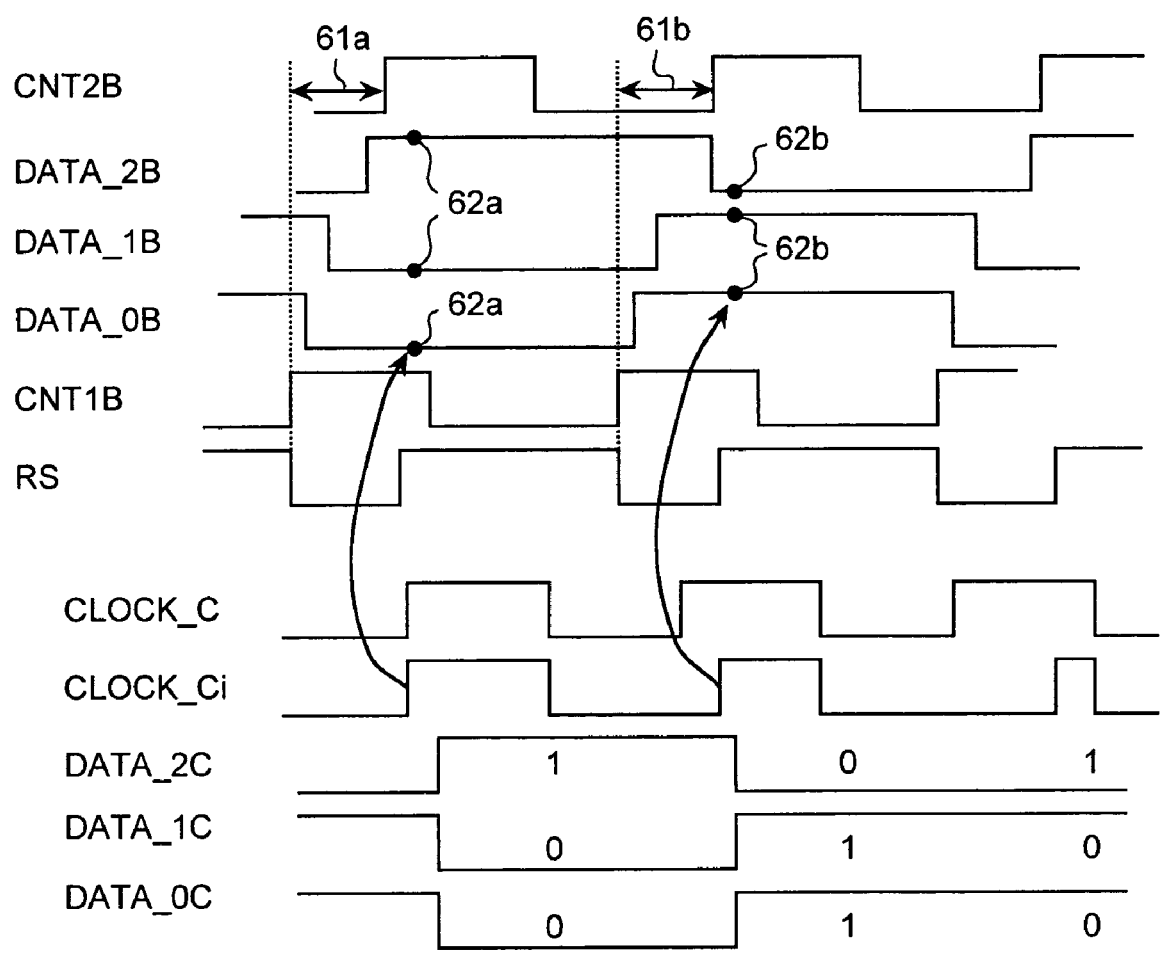
FIG. 5 is a timing chart to explain the operation of the asynchronous data transmitting apparatus shown in FIG. 4.

FIG. 5 shows the operation timing of the receiver 20b. In the receiver 20b, the control signal CNT1B that is the transmit clock CLOCK_A is at a trigger level, that is, at H level. Transmission data DATA_0B, DATA_1B, and DATA_2B sequentially reach the receiver 20b in a period 61a when the control signal CNT1B is at H level and in a period 61b when the control signal CNT2B that is the transmit clock CLOCK_A is at the trigger level, that is, at H level.

However, each data changes in the periods 61a and 61b. Thus, if the data is read into the receiver 20b in the periods 61a and 61b, the problem of incorrect data reading caused due to a skew between the data may occur. H level, that is the trigger level and L level, that is a non-trigger level change in an identical fashion for the control signals CNT1B and CNT2B. Thus in the periods 61a and 61b, both the control signals CNT1B and CNT2B are at variance.

Consequently, the suppression period determining circuit 41b detects, as the reception suppressing periods, the variance periods 61a and 61b in the receive clock generator 40b and generates an L level reception suppressing signal RS in the reception suppressing periods 61a and 61b. The receive clock suppressing circuit 42 retrieves the logical product of the reception suppressing signal RS and the receive clock CLOCK_C. The receive clock suppressing circuit 42 then generates the reading clock CLOCK_Ci that is obtained by shifting the clock edge of the receive clock CLOCK_C, which rises to the trigger level, to a position after the reception suppressing periods 61a and 61b.

As a result, similar to the first embodiment, data reading timings 62a and 62b, that is, the timings when the transmission data DATA_2B, DATA_1B, and DATA_0B from signal transmission lines 30a, 30b, and 30c are read into the leading edge of a reading clock CLOCK_Ci, always fall after the change has taken place in all the data, as shown in FIG. 5. Thus, reading of an incorrect data is definitively prevented.

In this way, in the second embodiment, it is necessary to set the time width of the skew between the data in such a way that this time width falls within the time width of the trigger level of the transmit clock. However, as the transmit clock is employed in the control signals, a control signal output terminal of the transmitter remains only as a buffer, thus making the overall structure simpler.

Figure 6:
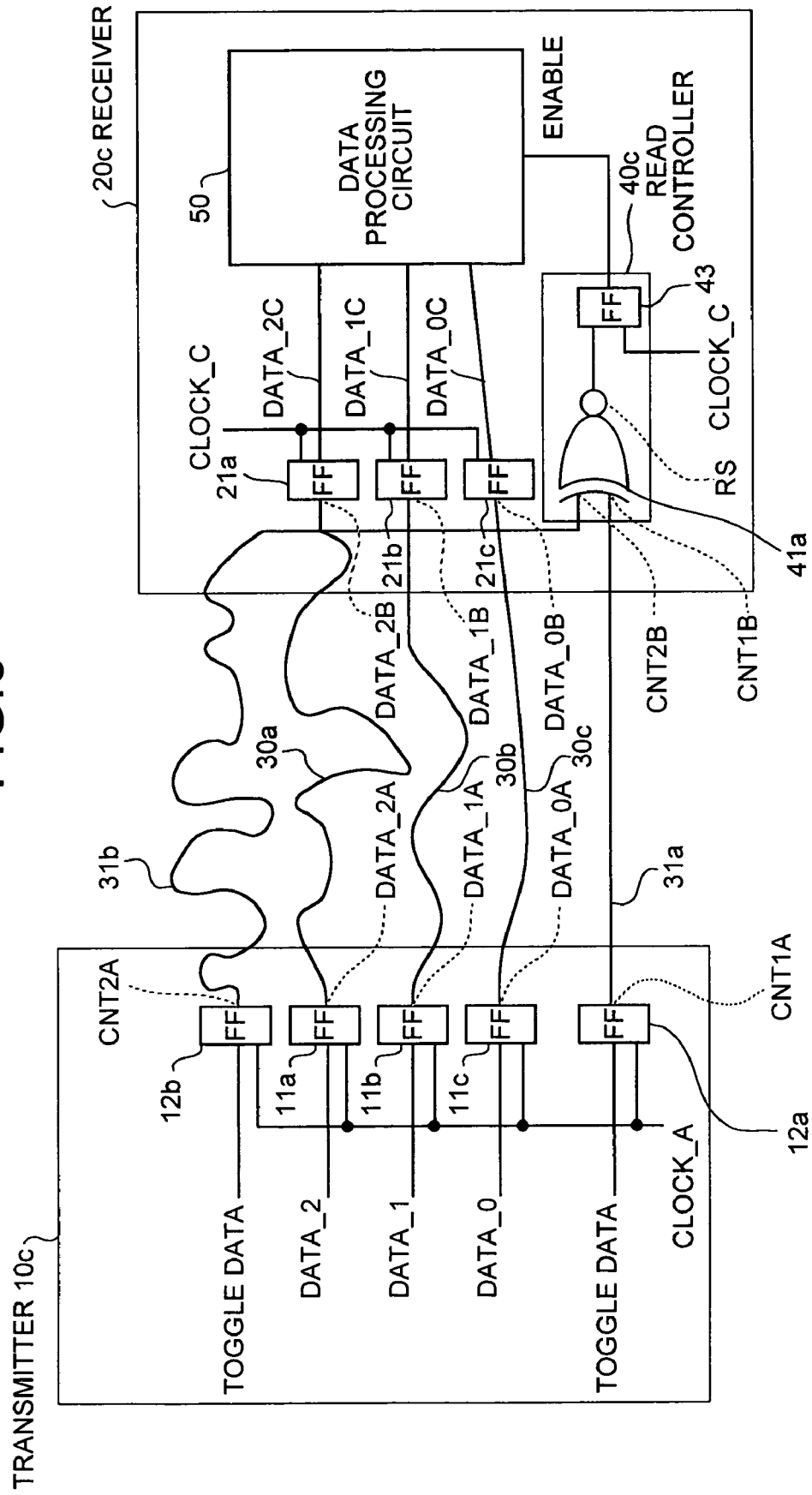
FIG. 6 is a block diagram of an asynchronous data transmitting apparatus according to a third embodiment of the present invention.

FIG. 6 is a block diagram of an asynchronous data transmitting apparatus according to a third embodiment of the present invention. The parts in FIG. 6 that are identical or equivalent to those in FIG. 1 are assigned the same reference numerals. In this section, the focus is mainly on the parts present in the third embodiment.

The asynchronous data transmitting apparatus shown in FIG. 6 includes a receiver 20c, substituted in place of the receiver 20a shown in FIG. 1. The receiver 20c includes a read controller 40c, substituted in place of the receive clock generator 40a shown in FIG. 1 and a data processing circuit 50 which is newly added to the receiver 20c. Reception flip-flops 21a, 21b, and 21c operate in synchronization with a receive clock CLOCK_C. The reception flip-flops 21a, 21b, and 21c read reception data DATA_0C, DATA_1C, and DATA_2C and assign that reception data to the data processing circuit 50.

The read controller 40c includes a deciding flip-flop 43, substituted in place of the receive clock suppressing circuit 42 of the receive clock generator 40a shown in FIG. 1. The deciding flip-flop 43 reads, according to the receive clock CLOCK_C, a reception suppressing signal RS that is the output of a suppression period determining circuit 41a and outputs an enable signal Enable that determines whether the reception data is 'VALID' or 'INVALID'.

According to the enable signal ENABLE, the data processing circuit 50 is endowed with a functionality of determining the validity of the reception data DATA_0C, DATA_1C, and DATA_2C that are input from the reception flip-flops 21a, 21b, and 21c, and carrying out the reception process.

The operation of the asynchronous data transmitting apparatus described above is explained next with reference to FIG. 6 and a timing chart shown in FIG. 7.

Figure 7:
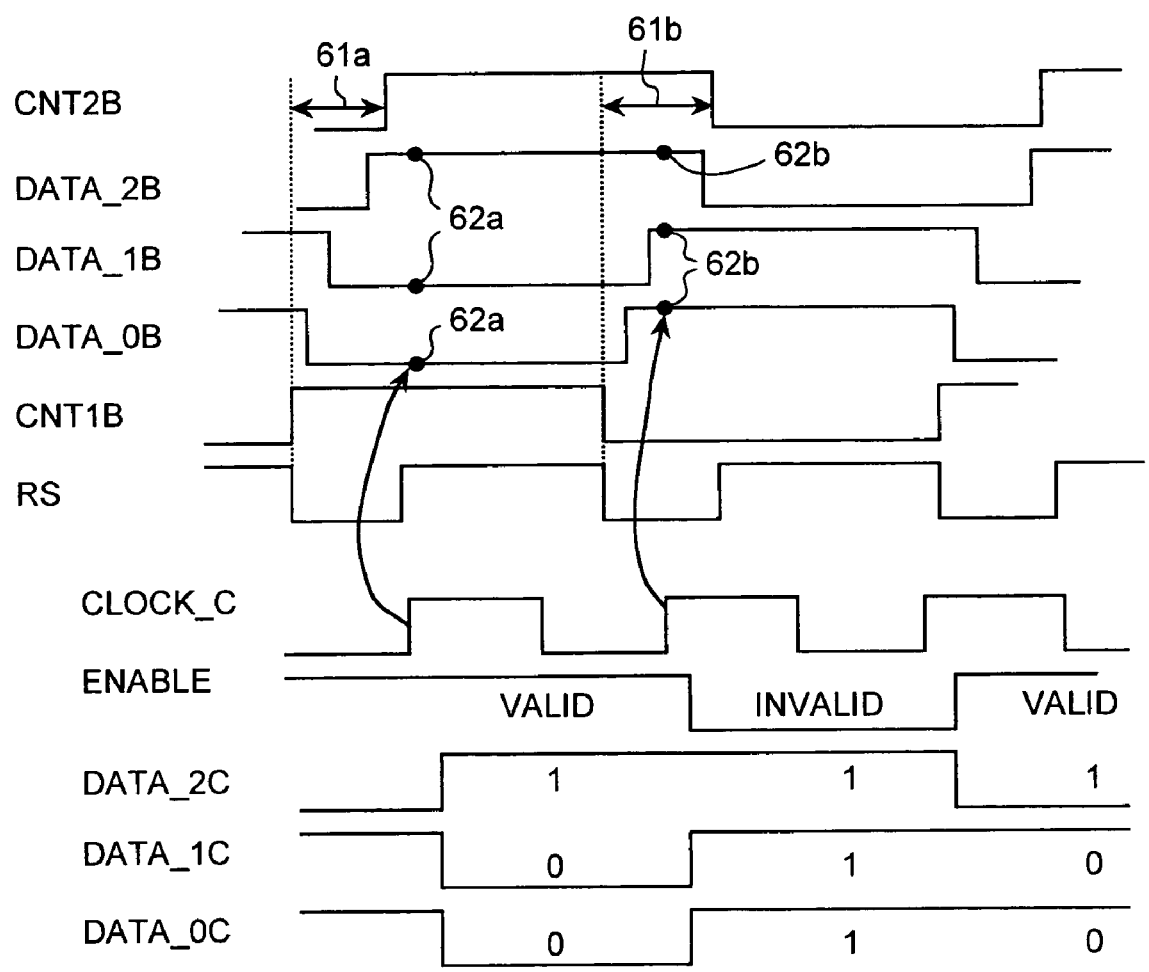
FIG. 7 is a timing chart to explain the operation of the asynchronous data transmitting apparatus shown in FIG. 6.

FIG. 7 shows the operation timing in the receiver 20c. Transmission data DATA_0B, DATA_1B, and DATA_2B sequentially reach the receiver 20c in a period 61a when a control signal CNT1B that is a toggle data reaches the receiver 20c and in a period 61b when a control signal CNT2B that is a toggle data reaches the receiver 20c. However, each data changes in the periods 61a and 61b.

H level and L level both change in an identical fashion for the control signals CNT1B and CNT2B. Thus in the periods 61a and 61b from when the control signal CNT1B arrives till the control signal CNT 2B arrives, both the control signals CNT1B and CNT2B are at variance. Consequently, similar to the first embodiment, the suppression period determining circuit 41a detects, as the reception suppressing periods, the variance periods 61a and 61b in the read controller 40c and generates an L level reception suppressing signal RS in the reception suppressing periods 61a and 61b.

However, the period when the receive clock CLOCK_C is at a trigger level may fall outside or overlap with the period in which the reception suppressing signal RS is generated. In FIG. 7, the period in which the reception suppressing signal RS is generated for the period 61a falls prior to, and not overlapping with, the trigger level period of the receive clock CLOCK_C, whereas the period in which the reception suppressing signal RS is generated for the period 61b overlaps with the trigger level period of the receive clock CLOCK_C.

Consequently, in the reception flip-flops 21a, 21b, and 21c that read the data in synchronization with the receive clock CLOCK_C, the data reading is carried out either at a data reading timing 62a, which falls after the reception suppressing period 61a, or at a data reading timing 62b, which falls inside the reception suppressing period 61b. Obviously, correct data is read at the data reading timing 62a and incorrect data is read at the data reading timing 62b.

In the deciding flip-flop 43 in which the reception suppressing signal RS is read in synchronization with the receive clock CLOCK_C, the reception suppressing signal RS is of H level at the time of reading the correct data and of L level at the time of reading the incorrect data.

Consequently, the deciding flip-flop 43 outputs the enable signal ENABLE at H level, which indicates that the reception data is 'VALID', at the time of reading the correct data and outputs the enable signal ENABLE at L level, which indicates that the reception data is 'INVALID'.

Thus according to the enable signal ENABLE, it is possible to carry out a correct reception process in the data processing circuit 50. In other words, in the reception process of the reception data that is read at the data reading timing 62a, because the enable signal Enable is at H level which indicates that the reception data is 'VALID', the input reception data "100" is assessed to be correct. In the reception process of the reception data that is read at the data reading timing 62b, because the enable signal ENABLE is at L level which indicates that the reception data is 'INVALID', the input reception data "111" is assessed to be incorrect.

In this way, according to the third embodiment, the problem of a skew between the data is definitively prevented, as in the first and second embodiments. Besides, in the receiver according to the third embodiment, the delay occurring between the receive clock and the output of the reception flip-flop can be reduced since no logic circuit is inserted in the receive clock at the receiving end.

In the third embodiment, toggle data is used as the control signal. However, when the time width of the skew between the data falls within the time width of the trigger level of the transmit clock, the transmit clock can be treated as the control signal, as in the second embodiment. In this case, the suppression period determining circuit 41b shown in FIG. 4 may be employed, substituted in place of the suppression period determining circuit 41a of the read controller 40c. An enable signal that has identical specifications can thus be generated.

Figure 8:
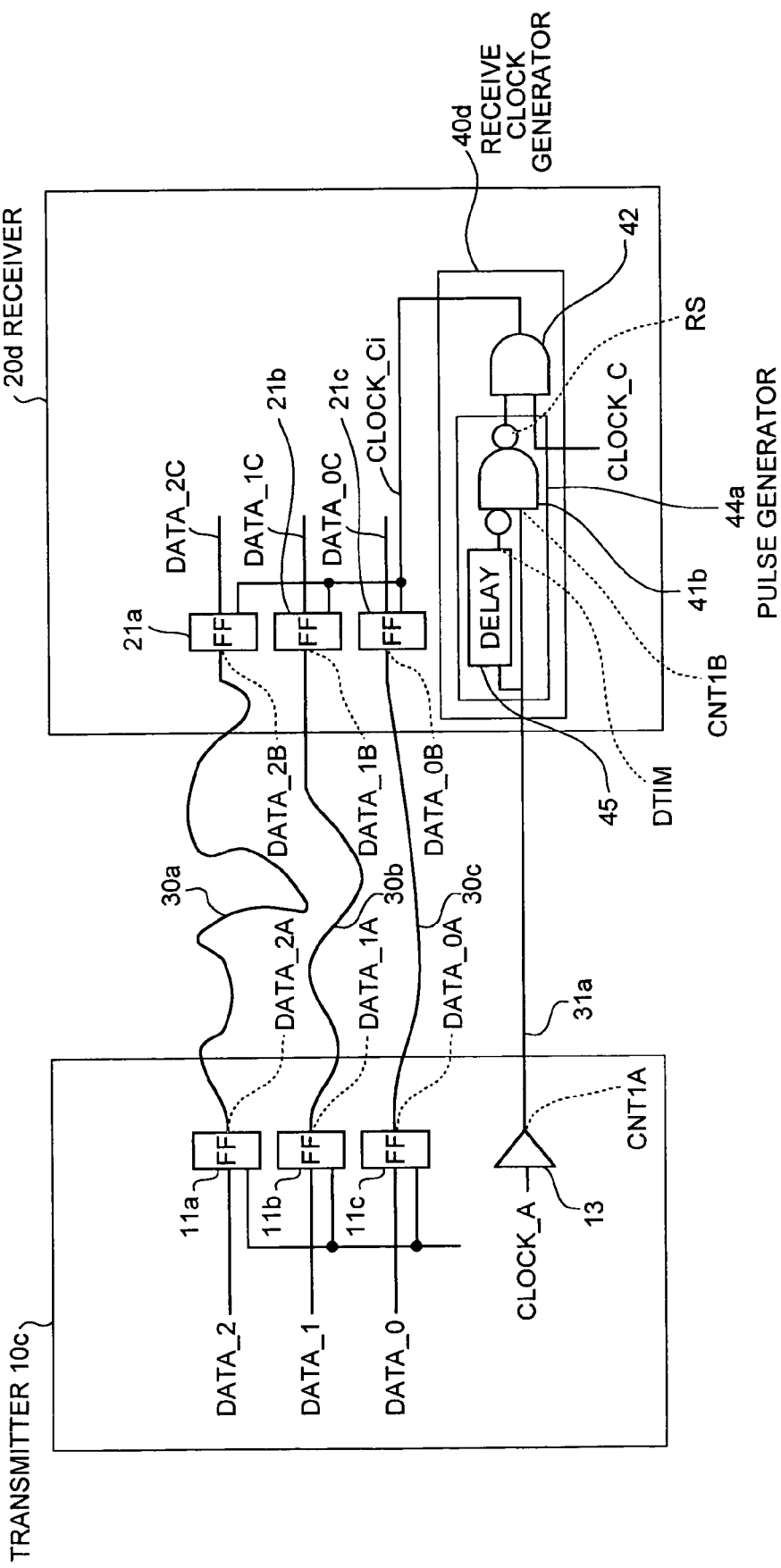
FIG. 8 is a block diagram of an asynchronous data transmitting apparatus according to a fourth embodiment of the present invention.

FIG. 8 is a block diagram of an asynchronous data transmitting apparatus according to a fourth embodiment of the present invention. The parts in FIG. 8 that are identical or equivalent to those in FIG. 4 are assigned the same reference numerals. In this section, the focus is mainly on the parts present in the fourth embodiment.

The asynchronous data transmitting apparatus shown in FIG. 8 includes a transmitter 10c, substituted in place of the transmitter 10b shown in FIG. 4 and a receiver 20d, substituted in place of the receiver 20b shown in FIG. 4. A control transmission line 31a that assigns the minimum delay amount is the only control transmission line present.

Apart from the transmission flip-flops 11a, 11b, 11c of the receiver 10b shown in FIG. 4, the receiver 10c comprises a buffer 13 that transmits to the control transmission line 31a a transmit clock CLOCK_A as a control signal. The receiver 20*d* includes a receive clock generator 40*d*, substituted in place of the receive clock generator 40*b*.

The receive clock generator 40*d* includes a delay circuit (DELAY) 45 provided between an inverting input terminal of the suppression period determining circuit 41*b* shown in FIG. 4 and the control transmission line 31*a*. A pulse generator 44*a* is provided in the entire delay circuit 45 and the entire suppression period determining circuit 41*b*.

In other words, the delay circuit 45 assigns to the inverting input terminal of the suppression period determining circuit 41*b* a delay signal DTIM obtained by delaying a control signal CNT1B, which is a transmission line signal (a transmit clock CLOCK_A), exactly by the maximum delay amount. In the period from the time when the transmit clock CLOCK_A, which is the control signal CNT1B, directly input from the control transmission line 31*a* reaches a trigger level till the time when the delayed transmit clock CLOCK_A input from the delay circuit 45 reaches the trigger level, the suppression period determining circuit 41*b* generates a reception suppressing signal RS, which is an L level pulse signal. Consequently, a receive clock suppressing circuit 42 can generate a reading clock CLOCK_Ci that has identical specifications to that in the second embodiment.

The operation of the asynchronous data transmitting apparatus described above is explained next with reference to FIG. 8 and a timing chart shown in FIG. 9.

Figure 9:
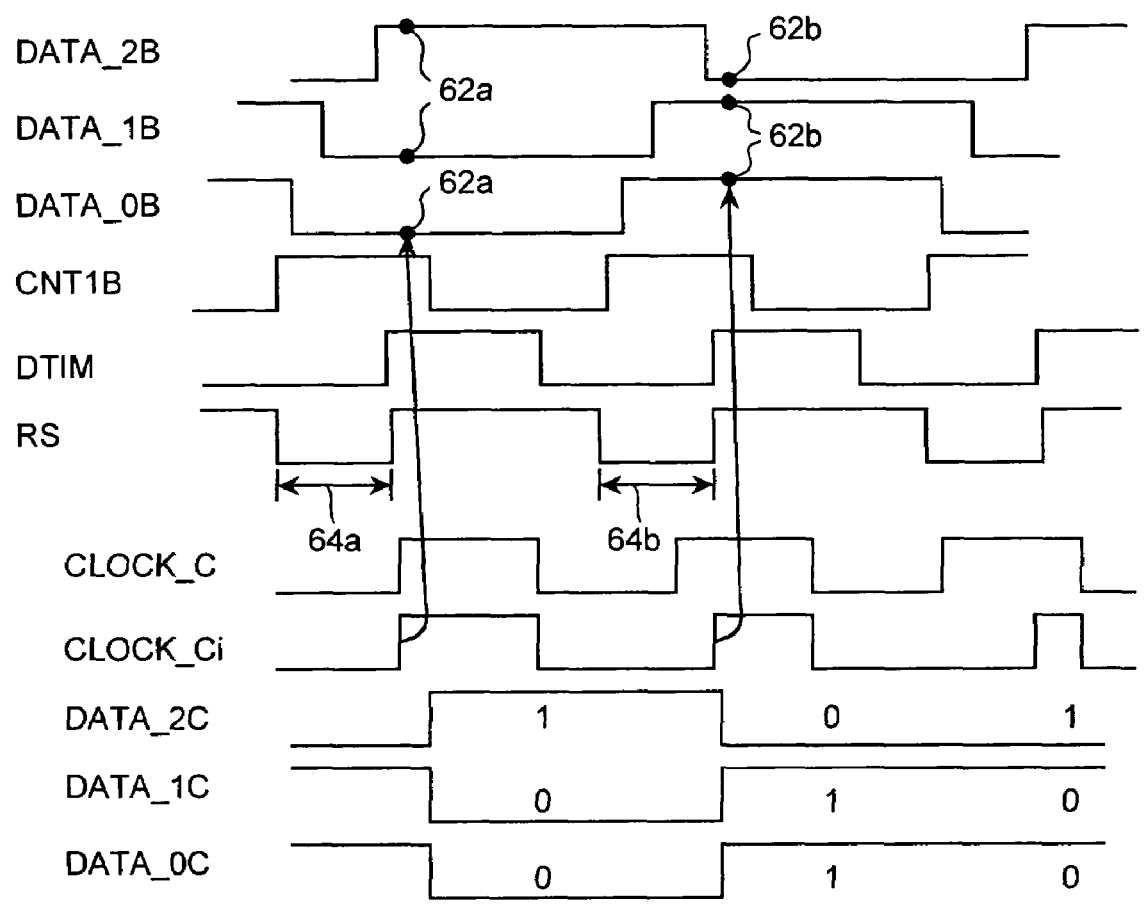
FIG. 9 is a timing chart to explain the operation of the asynchronous data transmitting apparatus shown in FIG. 8.

FIG. 9 shows the operation timing of the receiver 20*d*. Transmission data DATA_0B, DATA_1B, and DATA_2B sequentially reach the receiver 20*d* in the predetermined period when the control signal CNT1B is at H level, that is, the trigger level.

At this time, as the control signal is delayed exactly by the maximum delay amount, the delay circuit 45 generates the delay signal DTIM after the transmission data DATA_2B arrives. Consequently, each of the transmission data DATA_0B, DATA_1B, and DATA_2B changes in a period 64*a* when the control signal CNT1B reaches and in a period 64*b* when the delay signal DTIM is generated. In the periods 64*a* and 64*b*, the suppression period determining circuit 41*b* can generate the reception suppressing signal RS, which is at L level.

The receive clock suppressing circuit 42 retrieves the logical product of the reception suppressing signal RS and a receive clock CLOCK_C. If the receive clock suppressing circuit 42 generates a reading clock CLOCK_Ci that is obtained by shifting the clock edge of the receive clock CLOCK_C, which rises to the trigger level, to a position after the reception suppressing periods 64*a* and 64*b*, then it is possible to position data reading timings 62*a* and 62*b*, that is the timings when the transmission data DATA_0B, DATA_1B, and DATA_2B from control transmission lines 30*a*, 30*b*, and 30*c* are read into the leading edge of the reading clock CLOCK_Ci, always fall after the change has taken place in all the data, as shown in FIG. 9. Thus, reading of an incorrect data is definitively prevented.

In this way, according to the fourth embodiment, results similar to that of the first through third embodiments can be obtained. Besides, a single control transmission line is sufficient to carry out the operation, thus making the overall structure of the transmission line simpler. In the fourth embodiment, the transmit clock is employed as the control signal. However, it is possible to treat toggle data as the control signal, as in the first embodiment. In this case, the structure may be such that the pulse generator responds to rising as well as trailing of the toggle data signal.

Figure 10:
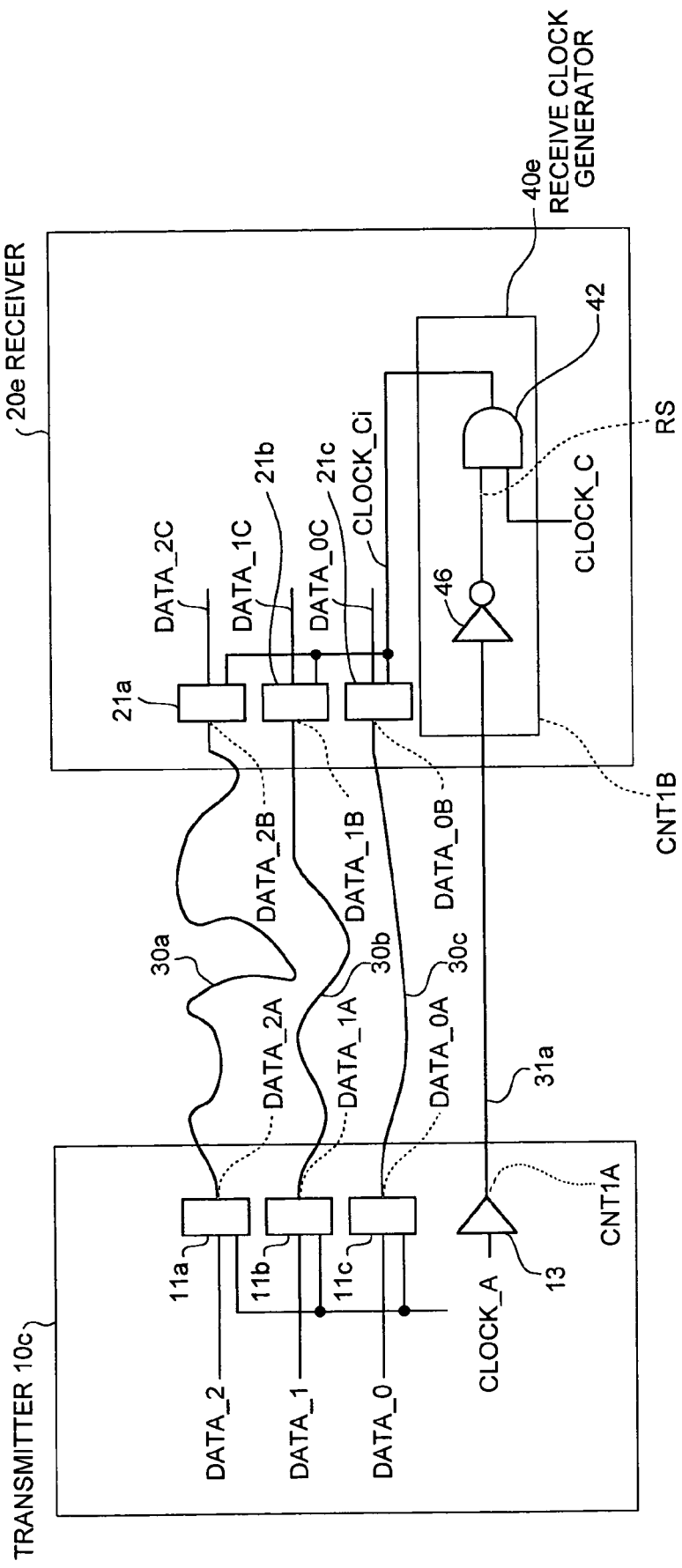
FIG. 10 is a block diagram of a receiver included in an asynchronous data transmitting apparatus according to a fifth embodiment of the present invention.

FIG. 10 is a block diagram of an asynchronous data transmitting apparatus according to a fifth embodiment of the present invention. The parts in FIG. 10 that are identical or equivalent to those in FIG. 8 are assigned the same reference numerals. In this section, the focus is mainly on the parts present in the fifth embodiment.

The asynchronous data transmitting apparatus shown in FIG. 10 includes a receiver 20*e*, substituted in place of the receiver 20*d* shown in FIG. 8. The receiver 20*e* comprises a receive clock generator 40*e*, substituted in place of the receive clock generator 40*d*.

The receive clock generator 40*e* includes an inverting circuit 46, substituted in place of the pulse generator 44*a* of the receive clock generator 40*d*. In other words, a control signal CNT1B, which is a transmission line signal (a transmit clock CLOCK_A) of a control transmission line 31*a*, is inverted by the inverting circuit 46 and input into a receive clock suppressing circuit 42.

Consequently, as a reception suppressing signal RS, which is the output of the inverting circuit 46, is at L level in a trigger level period of the transmit clock CLOCK_A, the receive clock suppressing circuit 42 can generate a reading clock CLOCK_Ci with same timing as that of the fourth embodiment.

The operation of the asynchronous data transmitting apparatus described above is explained next with reference to FIG. 10 and a timing chart shown in FIG. 11.

Figure 11:
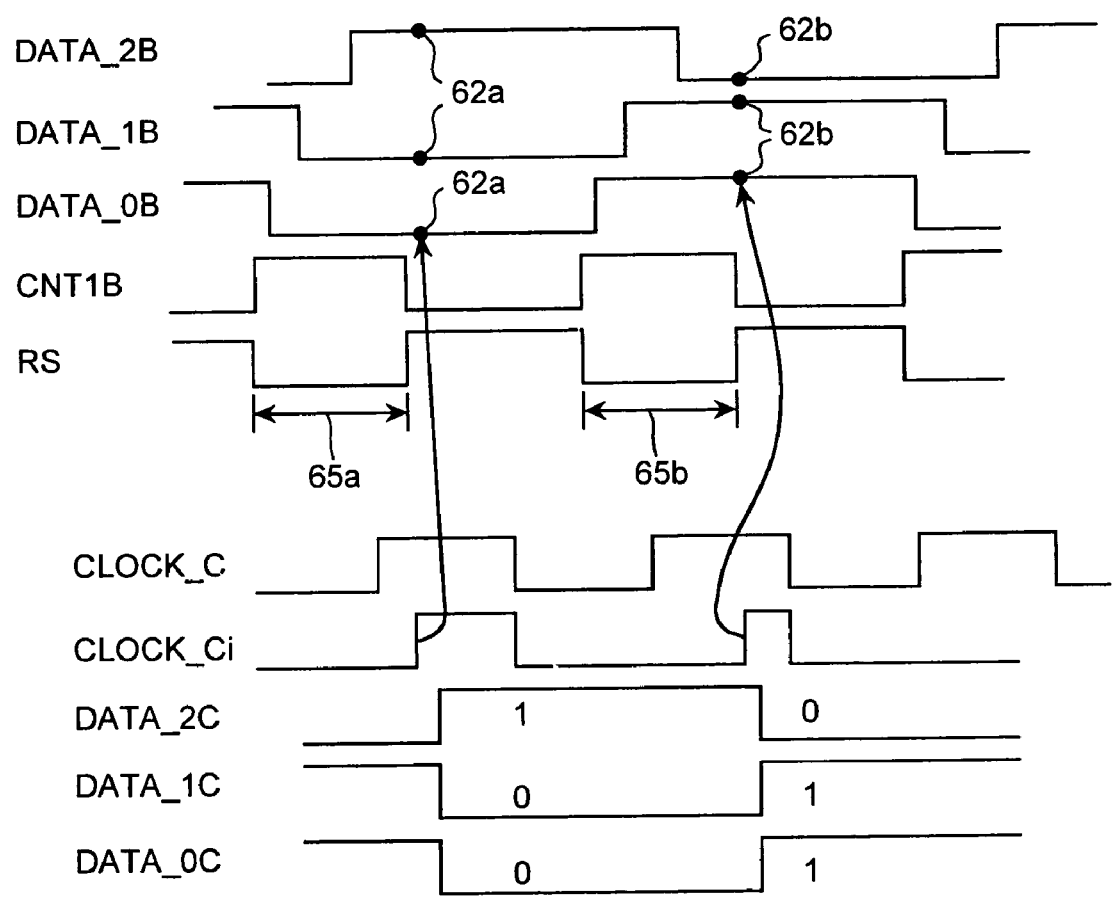
FIG. 11 is a timing chart to explain the operation of the asynchronous data transmitting apparatus shown in FIG. 10.

FIG. 11 shows the operation timing of the receiver 20*e*. Transmission data DATA_0B, DATA_1B, and DATA_2B sequentially reach the receiver 20*e* in the predetermined period when the transmit clock CLOCK_A, which is the control signal CNT1B, is at a trigger level.

The control signal CNT1B is inverted by the inverting circuit 46 and is input into the receive clock suppressing circuit 42 as the reception suppressing signal RS. Thus the reception suppressing signal RS that is input into the receive clock suppressing circuit 42 includes periods 65*a* and 65*b* in which the trigger level of the transmit clock CLOCK_A is inverted and is at L level. Transmission data DATA_0B, DATA_1B, and DATA_2B sequentially reach in these periods 65*a* and 65*b*.

The receive clock suppressing circuit 42 retrieves the logical product of the reception suppressing signal RS and a receive clock CLOCK_C. If the receive clock suppressing circuit 42 generates a reading clock CLOCK_Ci that is obtained by shifting the clock edge of the receive clock CLOCK_C, which rises to the trigger level, to a position after reception suppressing periods 64*a* and 64*b*, then it is possible to position data reading timings 62*a* and 62*b*, that is the timings when the transmission data DATA_0B, DATA_1B, and DATA_2B from control transmission lines 30*a*, 30*b*, and 30*c* are read into the leading edge of the reading clock CLOCK_Ci, always fall after the change has taken place in all the data, as shown in FIG. 11. Thus, reading of an incorrect data is definitively prevented.

In this way, according to the fifth embodiment, it is necessary to set the time width of a skew between the data in such a way that this time width falls within the time width of the trigger level of the transmit clock. However, a single control transmission line is sufficient to carry out the operation, thus making the overall structure of the transmission line as well as that of the receiver simpler.

Figure 12:
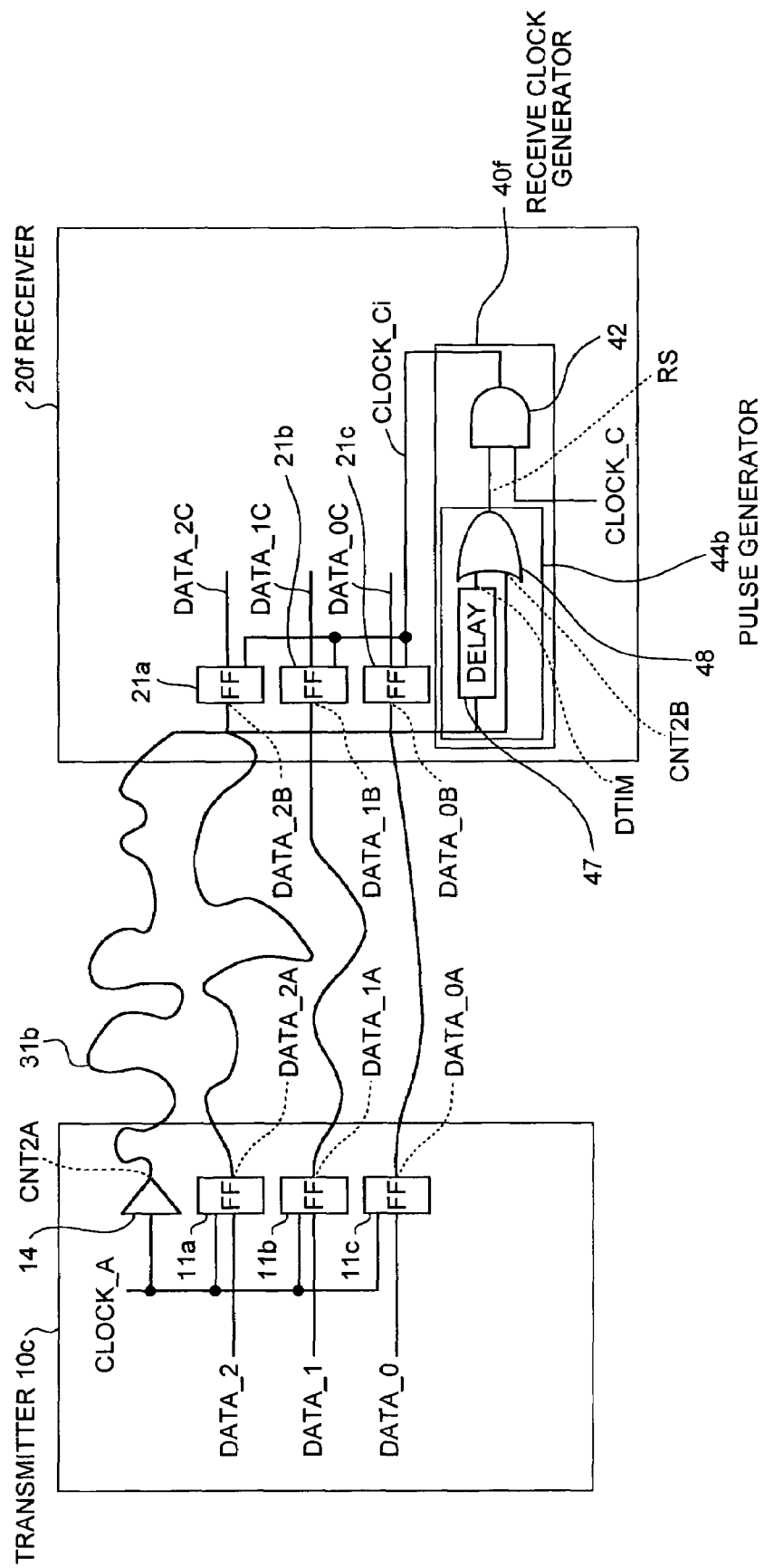
FIG. 12 is a block diagram of an asynchronous data transmitting apparatus according to a sixth embodiment of the present invention.

FIG. 12 is a block diagram of an asynchronous data transmitting apparatus according to a sixth embodiment of the present invention. The parts in FIG. 12 that are identical or equivalent to those in FIG. 4 are assigned the same reference numerals. In this section, the focus is mainly on the parts present in the sixth embodiment.

The asynchronous data transmitting apparatus shown in FIG. 12 includes a transmitter 10d, substituted in place of the transmitter 10b shown in FIG. 4 and a receiver 20f, substituted in place of the receiver 20b shown in FIG. 4. A control transmission line 31b that assigns the maximum delay amount is the only control transmission line present.

Apart from the transmission flip-flops 11a, 11b, 11c of the receiver 10b shown in FIG. 4, the receiver 10d comprises a buffer 14 that transmits to the control transmission line 31b a transmit clock as a control signal. The receiver 20f includes a receive clock generator 40f, substituted in place of the receive clock generator 40b.

The receive clock generator 40f includes a pulse generator 44b that generates a reception suppressing signal RS from a transmission line signal (a transmit clock CLOCK_A) and assigns the reception suppressing signal RS to a receive clock suppressing circuit 42. The pulse generator 44b includes a delay circuit (DELAY) 47 that outputs a delay signal DTIM obtained by delaying by a predetermined delay amount a control signal CNT2B, which is a transmission line signal (a transmit clock CLOCK_A) of the control transmission line 31b, and an OR circuit 48 that outputs the reception suppressing signal RS, which is a pulse signal and includes a predetermined time width, by taking a logical product of the transmission line signal (the transmit clock CLOCK_A) of the control transmission line 31b and the output of the delay circuit 47. Consequently, the receive clock suppressing circuit 42 can generate a reading clock CLOCK_Ci that has identical specifications to that in the second embodiment.

The operation of the asynchronous data transmitting apparatus described above is explained next with reference to FIG. 12 and a timing chart shown in FIG. 13.

Figure 13:
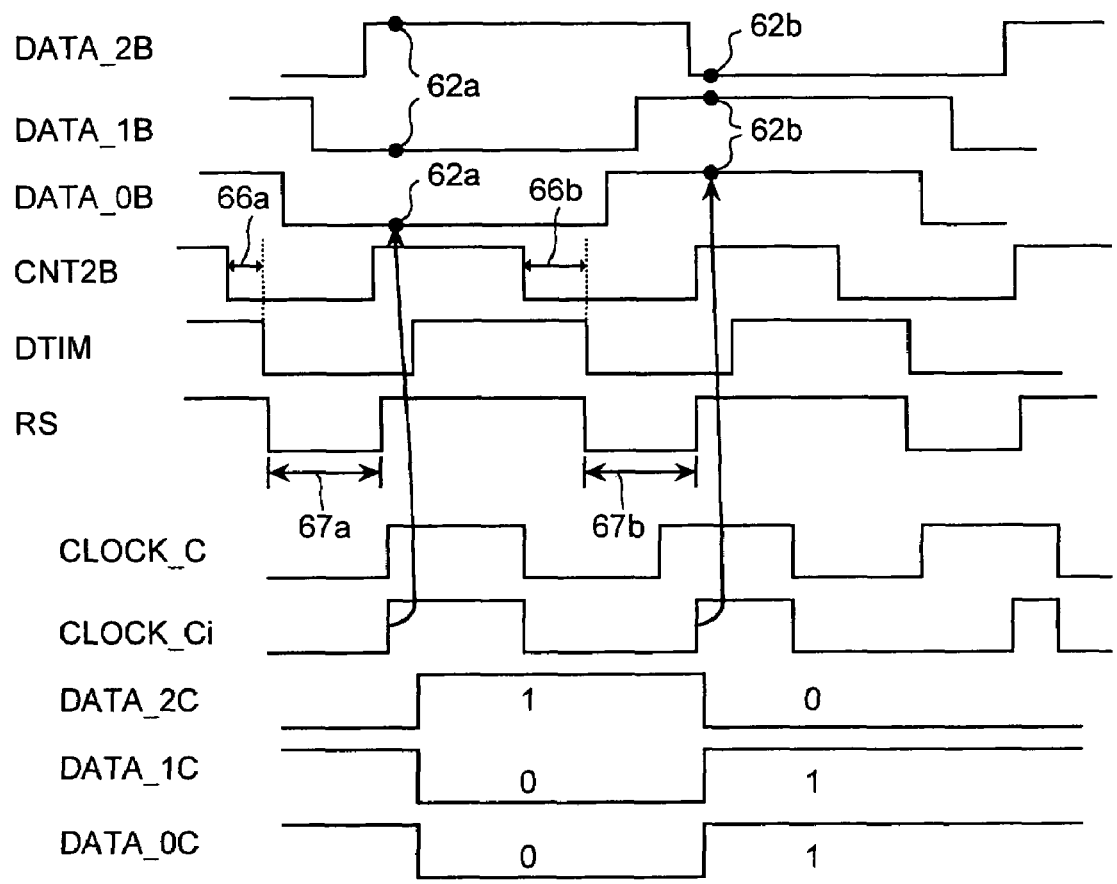
FIG. 13 is a timing chart to explain the operation of the asynchronous data transmitting apparatus shown in FIG. 12.

FIG. 13 shows the operation timing of the receiver 20f. Transmission data DATA_0B, DATA_1B, and DATA_2B sequentially reach the receiver 20f in the predetermined period when the transmit clock CLOCK_A, which is the control signal CNT2B is at L level, that is, a non-trigger level.

At this time, the delay circuit 47 outputs to one of the input terminals of the OR circuit 48 the control signal CNT2B delayed exactly by predetermined periods 66a and 66b that fall after the arrival time of the first transmission data, that is, DATA_0B. On the other hand, the control signal CNT2B is directly input to the other input terminal of the OR circuit 48. Consequently, the output of the OR circuit 48, that is, an L level reception suppressing signal RS, trails the trailing position of the control signal CNT2B by a position delayed exactly by the predetermined periods 66a and 66b. The reception suppressing signal RS becomes a pulse signal of L level in time widths 67a and 67b when the reception suppressing signal RS rises to a position where the trailing position and the rising position of the control signal CNT2B match.

In the L level time widths 67a and 67b of the reception suppressing signal RS, each of the transmission data DATA_0B, DATA_1B, and DATA_2B changes. Consequently, the receive clock suppressing circuit 42 retrieves the logical product of the reception suppressing signal RS and a receive clock CLOCK_C. If the receive clock suppressing circuit 42 generates the reading clock CLOCK_Ci that is obtained by shifting the clock edge of the receive clock CLOCK_C, which rises to the trigger level, to a position after reception suppressing periods 67a and 67b, then it is possible to position data reading timings 62a and 62b, that is the timings when the transmission data DATA_0B, DATA_1B, and DATA_2B from control transmission lines 30a, 30b, and 30c are read into the leading edge of the reading clock CLOCK_Ci, always fall after the change has taken place in all the data, as shown in FIG. 13. Thus, reading of an incorrect data is definitively prevented.

In this way, according to the sixth embodiment, results similar to that of the first through fifth embodiments can be obtained. Besides, a single control transmission line is sufficient to carry out the operation, thus making the overall structure of the transmission line simpler.

Figure 14:
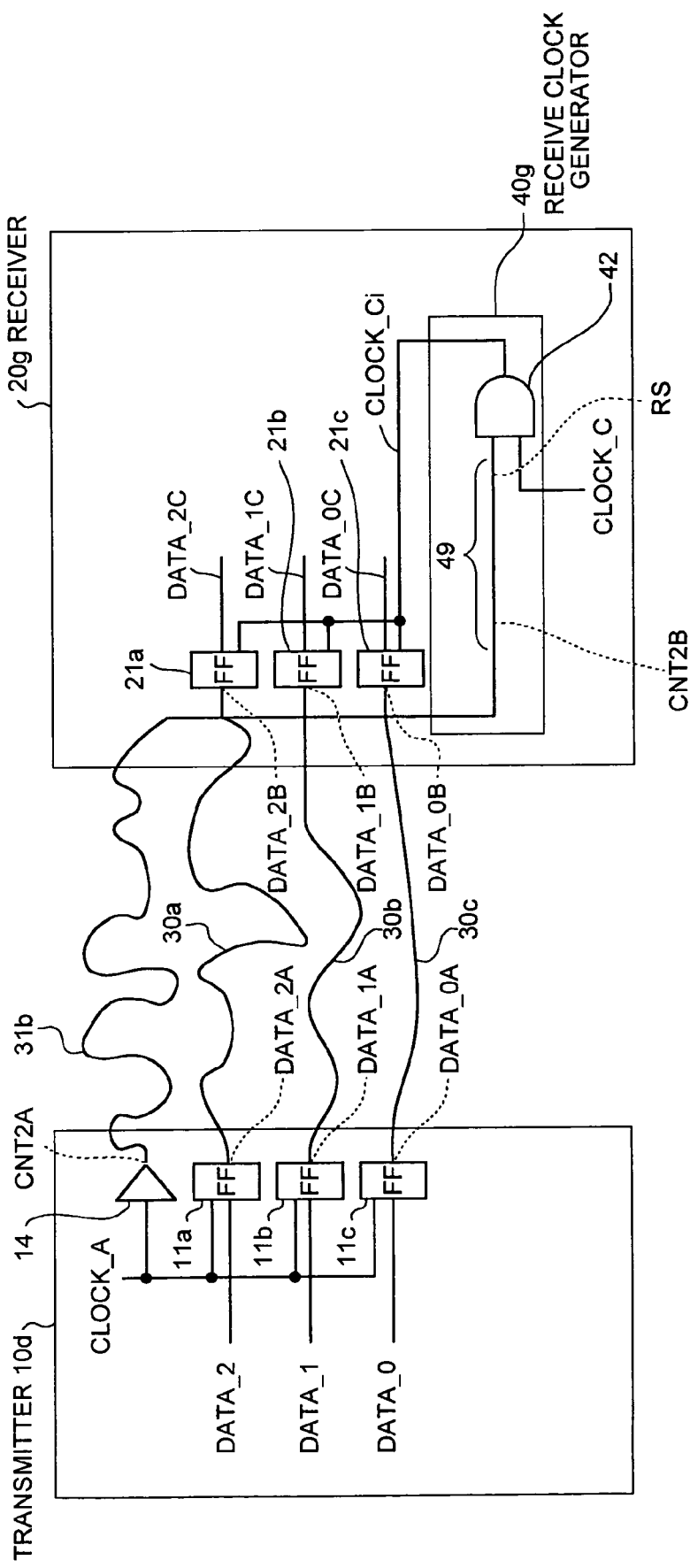
FIG. 14 is a block diagram of an asynchronous data transmitting apparatus according to a seventh embodiment of the present invention.

FIG. 14 is a block diagram of an asynchronous data transmitting apparatus according to a seventh embodiment of the present invention. The parts in FIG. 14 that are identical or equivalent to those in FIG. 12 are assigned the same reference numerals. In this section the focus is mainly on the parts present in the seventh embodiment.

The asynchronous data transmitting apparatus shown in FIG. 14 includes a receiver 20g, substituted in place of the receiver 20f shown in FIG. 12. The receiver 20g includes a receive clock generator 40g, substituted in place of the receive clock generator 40f.

The receiver 20g includes an extension circuit 49, substituted in place of the pulse generator 44b shown in FIG. 12. The extension circuit 49 may be omitted and a control signal CNT2B, which is a transmission line signal (a transmit clock CLOCK_A) from a control transmission line 31b, may be directly input into a receive clock suppressing circuit 42. In other words, in the seventh embodiment, the reception suppressing period of L level indicated by a reception suppressing signal RS, which is input into the receive clock suppressing circuit 42, is the non-trigger period of the transmit clock CLOCK_A, which is the control signal CNT2B.

The operation of the asynchronous data transmitting apparatus described above is explained next with reference to FIG. 14 and a timing chart shown in FIG. 15.

Figure 15:
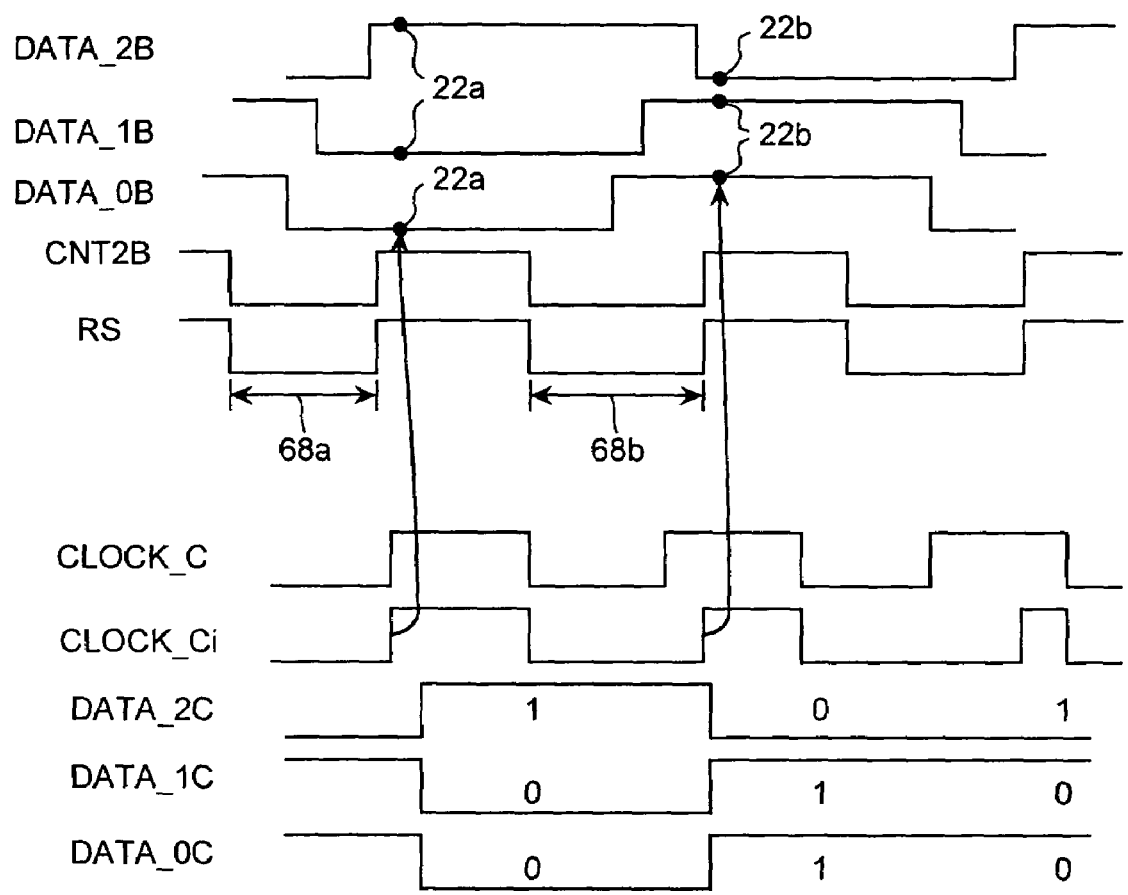
FIG. 15 is a timing chart to explain the operation of the asynchronous data transmitting apparatus shown in FIG. 14.
Figure 16:
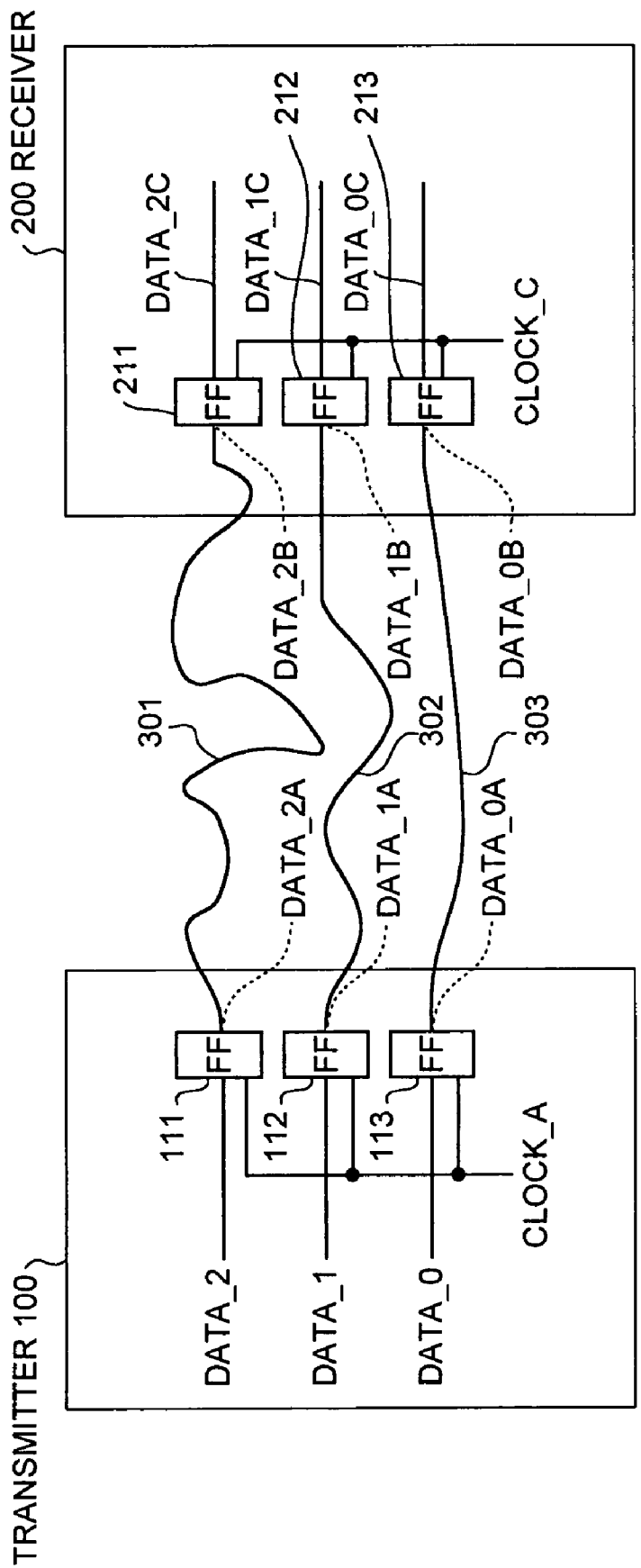
FIG. 16 is a block diagram of a conventional asynchronous data transmitting apparatus.
Figure 17:
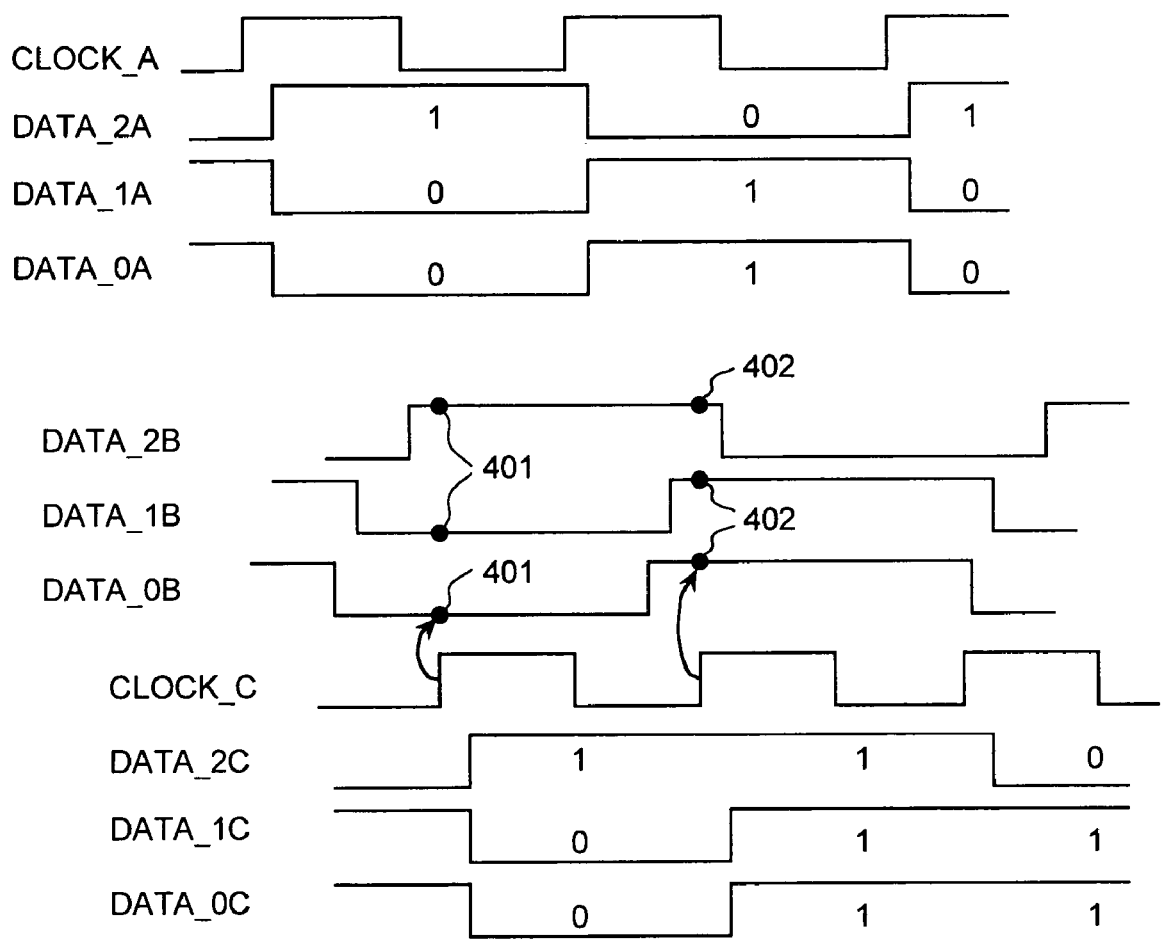
FIG. 17 is a timing chart to explain the reception operation when a skew occurs in the asynchronous data transmitting apparatus shown in FIG. 16.

FIG. 15 shows the operation timing of the receiver 20g. Transmission data DATA_0B, DATA_1B, and DATA_2B sequentially reach the receiver 20g in predetermined periods 68a and 68b at L level when the control signal CNT1B is at the non-trigger level.

Consequently, the receive clock suppressing circuit 42 retrieves the logical product of the reception suppressing signal RS, which treats the predetermined periods 68a and 68b as a reception suppressing period when the control signal CNT1B is of L level, that is, the non-trigger level, and a receive clock CLOCK_C. If the receive clock suppressing circuit 42 generates a reading clock CLOCK_Ci that is obtained by shifting the clock edge of the receive clock CLOCK_C, which rises to the trigger level, to a position after reception suppressing periods 67a and 67b, then it is possible to position data reading timings 62a and 62b, that is the timings when the transmission data DATA_0B, DATA_1B, and DATA_2B from control transmission lines 30a, 30b, and 30c are read into the leading edge of the reading clock CLOCK_Ci, always fall after the change has taken place in all the data, as shown in FIG. 15. Thus, reading of an incorrect data is definitively prevented.

In this way, in the seventh embodiment, it is necessary to set the time width of a skew between the data in such a way that this time width falls within the time width of the non-trigger level of the transmit clock. However, as in the first through sixth embodiments, the problem of a skew between the data can be prevented. Besides, the overall structure of the receiver is simpler.

According to the present invention, two control transmission lines are adjusted in order to hold the minimum delay amount and the maximum delay amount from among all the parallel transmission lines and one or both of these control transmission lines are provided in the asynchronous data transmitting apparatus. A control signal, which the control transmission line carries, is used to control in such a way that transmission signals from the parallel transmission lines are read at a timing when none of the transmission signals have changed. This enables prevention of an incorrect data reading due to a skew that occurs in the data of the parallel transmission lines and thereby improves the reliability of any type of asynchronous system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An asynchronous data transmitting apparatus, comprising:
   a first transmission line having a first delay;
   a second transmission line having a delay smaller than the first delay;
   a third transmission line having a delay larger than the first delay;
   a transmitter that includes
      a first transmitting unit that transmits a data signal through the first transmission line, in accordance with a first clock;
      a second transmitting unit that transmits a control signal through the second transmission line, in accordance with the first clock; and
      a third transmitting unit that transmits the control signal through the third transmission line, in accordance with the first clock; and
   a receiver that includes
      a clock generator that generates a second clock from the control signals transmitted through the second and third transmission lines, wherein a pulse of the second clock is provided in a period from a first pulse-edge of the control signal transmitted through the third transmission line to a second pulse-edge subsequent to the first pulse edge, the second pulse-edge being of the control signal transmitted through the second transmission line; and
      a data receiving unit that receives the data signal through the first transmission line, in accordance with the second clock.

2. The asynchronous data transmitting apparatus according to claim 1, wherein
   the control signal has two binary levels which alternate in each transmission cycle.

3. The asynchronous data transmitting apparatus according to claim 1, wherein
   the clock generator includes
      a first unit that outputs a suppressing signal during a period when logic levels of the control signals do not coincide; and
      a second unit that generates the second clock, in response to an end of the suppressing signal, in accordance with a third clock.

4. The asynchronous data transmitting apparatus according to claim 3, wherein
   the first unit is an EXNOR circuit to which the control signals transmitted through the second and third transmission lines are input, and the EXNOR circuit outputs the suppressing signal, and
   the second unit is an AND circuit to which the suppressing signal and the third clock, and the AND circuit outputs the second clock.

5. The asynchronous data transmitting apparatus according to claim 1, wherein
   the control signal is the first clock.

6. The asynchronous data transmitting apparatus according to claim 3, wherein
   the first unit is a NAND circuit to which the control signal transmitted through the second transmission line and an inversion of the control signal transmitted through the third transmission line are input, and the NAND circuit outputs the suppressing signal, and
   the second unit is an AND circuit to which the suppressing signal and the third clock, and the AND circuit outputs the second clock.

7. An asynchronous data transmitting apparatus, comprising:
   a first transmission line having a first delay;
   a second transmission line having a delay smaller than the first delay;
   a third transmission line having a delay larger than the first delay;
   a transmitter that includes
      a first transmitting unit that transmits a data signal through the first transmission line, in accordance with a first clock;
      a second transmitting unit that transmits a control signal through the second transmission line, in accordance with the first clock; and
      a third transmitting unit that transmits the control signal through the third transmission line, in accordance with the first clock; and
   a receiver that includes
      a data receiving unit that receives the data signal through the first transmission line, in accordance with a second clock; and
      a processing unit that generates an enable signal from the control signals transmitted through the second and third transmission line, and determines whether to read the received data signal based on the enable signal, wherein a pulse of the second clock is provided in a period from a first pulse-edge of the control signal transmitted through the third transmission line to a second pulse-edge subsequent to the first pulse edge, the second pulse-edge being of the control signal transmitted through the second transmission line.

8. The asynchronous data transmitting apparatus according to claim 7, wherein
   the control signal has two binary levels which alternate in each transmission cycle.

9. The asynchronous data transmitting apparatus according to claim 7, wherein
   the processing unit includes
      a first unit that outputs a suppressing signal during a period when logic levels of the control signals do not coincide; and
      a second unit that generates the enable signal, in response to an end of the suppressing signal, in accordance with the second clock.

10. The asynchronous data transmitting apparatus according to claim 9, wherein the first unit is an EXNOR circuit to which the control signals transmitted through the second and third transmission lines are input, and the EXNOR circuit outputs the suppressing signal, and the second unit is a flip flop to which the suppressing signal is input in accordance with the second clock, and the flip flop circuit outputs the enable signal.

11. The asynchronous data transmitting apparatus according to claim 7, wherein the control signal is the first clock.

* * * * *